(12) United States Patent
Kim et al.

(10) Patent No.: US 9,104,254 B2
(45) Date of Patent: Aug. 11, 2015

(54) TOUCH SCREEN PANEL

(71) Applicant: LG DISPLAY CO., LTD., Seoul (KR)

(72) Inventors: Dong Sup Kim, Seoul (KR); Jung Seok Seo, Daejeon (KR)

(73) Assignee: LG DISPLAY CO., LTD., Seoul (KR)

( * ) Notice: Subject to any disclaimer, the term of this patent is extended or adjusted under 35 U.S.C. 154(b) by 104 days.

(21) Appl. No.: 13/722,389

(22) Filed: Dec. 20, 2012

(65) Prior Publication Data

US 2014/0002378 A1    Jan. 2, 2014

(30) Foreign Application Priority Data

Jun. 27, 2012  (KR) .................. 10-2012-0069319

(51) Int. Cl.
*G06F 3/041* (2006.01)
*G06F 3/044* (2006.01)

(52) U.S. Cl.
CPC ............ *G06F 3/041* (2013.01); *G06F 3/044* (2013.01)

(58) Field of Classification Search
CPC ...................................... G06F 3/041
USPC ..................................... 345/173
See application file for complete search history.

(56) References Cited

U.S. PATENT DOCUMENTS

| | | | | |
|---|---|---|---|---|
| 6,147,680 A * | 11/2000 | Tareev | ............. | 345/173 |
| 6,535,200 B2 * | 3/2003 | Philipp | ............. | 345/168 |
| 7,864,160 B2 * | 1/2011 | Geaghan et al. | ............. | 345/173 |
| 8,610,689 B2 * | 12/2013 | Chang et al. | ............. | 345/173 |
| 2004/0239650 A1 * | 12/2004 | Mackey | ............. | 345/174 |
| 2007/0062739 A1 * | 3/2007 | Philipp et al. | ............. | 178/18.06 |
| 2007/0074914 A1 * | 4/2007 | Geaghan et al. | ............. | 178/18.06 |
| 2008/0309633 A1 * | 12/2008 | Hotelling et al. | ............. | 345/173 |
| 2010/0060596 A1 * | 3/2010 | Wright | ............. | 345/173 |
| 2010/0073319 A1 * | 3/2010 | Lyon et al. | ............. | 345/174 |
| 2011/0221698 A1 | 9/2011 | Ku et al. | | |
| 2011/0227858 A1 * | 9/2011 | An et al. | ............. | 345/174 |
| 2012/0139871 A1 * | 6/2012 | Ku et al. | ............. | 345/174 |
| 2012/0162123 A1 * | 6/2012 | Kent et al. | ............. | 345/174 |

(Continued)

FOREIGN PATENT DOCUMENTS

KR    10-2011-0103117 A    9/2011
KR       20120034483 A    4/2012

OTHER PUBLICATIONS

Office Action issued in Korean Patent Application No. 10-2012-0069319, mailed Nov. 25, 2014, 3 pages.

(Continued)

*Primary Examiner* — Christopher E Leiby
(74) *Attorney, Agent, or Firm* — Brinks Gilson & Lione

(57) ABSTRACT

Disclosed is a touch screen panel for improving touch sensitivity, the screen panel comprising a first electrode in a first direction; and a second electrode, insulated from the first electrode, in a second direction perpendicular to the first direction, wherein the first electrode includes a plurality of first patterns, and a second pattern formed as one body with the plurality of first patterns so as to connect the plurality of first patterns in the first direction; the second electrode includes a plurality of third patterns, and a fourth pattern formed as one body with the plurality of third patterns so as to connect the plurality of third patterns in the second direction; and the first pattern is provided at a predetermined distance in a horizontal direction from the third pattern, the second pattern crosses the fourth pattern, and an area of the first electrode is larger than an area of the second electrode.

14 Claims, 11 Drawing Sheets

(56) References Cited

U.S. PATENT DOCUMENTS

2013/0168138 A1* 7/2013 Yamazaki et al. ............ 174/253
2013/0278544 A1* 10/2013 Cok ............................. 345/174

OTHER PUBLICATIONS

Office Action issued in Korean Patent Application No. 10-2012-0069319, mailed Apr. 23, 2014, 4 pages.

* cited by examiner

TOUCH SCREEN PANEL

CROSS REFERENCE TO RELATED APPLICATIONS

This application claims the benefit of the Korean Patent Application No. 10-2012-0069319 filed on Jun. 27, 2012, which is hereby incorporated by reference as if fully set forth herein.

BACKGROUND

1. Field of the Disclosure

The present disclosure relates to a touch screen panel, and more particularly, to a capacitive type touch screen panel.

2. Discussion of the Related Art

With a development of various portable electronic devices such as a mobile phone and a notebook computer, a demand for flat display devices to be applied to the various portable electronic devices has been increased steeply.

For example, the flat display devices may include a liquid crystal display apparatus, a plasma display panel, a field emission display device, and a light emitting diode display device. Among the above flat display devices, an application of the liquid crystal display apparatus is gradually increased owing to advantageous of mass production technology, easy driving, high quality image with good resolution, and large-sized screen.

A touch screen is widely used as a substitute for an input device such as a mouse or a keyboard according to the related art, wherein the touch screen facilitates to directly input information to a screen through the use of finger or pen.

The touch screen panel is largely classified into a resistive type and a capacitive type. In this case, the resistive type senses a change of resistance value according to a contact between two substrates if a pressure is applied to a screen by the use of finger or stylus pen. Meanwhile, the capacitive type senses a change of capacitance according to a user's touch.

The capacitive type is advantageous in that it can decrease a thickness of the touch screen panel in comparison with that of the resistive type, it can improve endurance of a touch pad, and it can reduce malfunction caused by an external pressure. Furthermore, the capacitive type enables to perform a multi-touch function by freely expanding or reducing an image with two fingers. Accordingly, there is a recent trend toward high preference of the capacitive type.

FIG. 1 illustrates a flat display device with a capacitive type touch screen panel according to the related art.

Referring to FIG. 1, the capacitive type touch screen panel according to the related art includes a first electrode 120 formed in a first direction, a second electrode 130 formed in a second direction being perpendicular to the first direction, a connection line 140, and a touch pad 150.

The touch screen panel senses a change of capacitive between the first electrode 120 and the second electrode 130 according to whether or not there is a user's touch, to thereby sense a user's touch position.

The first electrode 120 is driven as a driving electrode to which a touch driving signal for sensing a user's touch is applied, and the first electrode 120 is connected with the touch pad 150 through the connection line 140. In this case, the touch pad 150 is connected with a driving electrode driver (not shown) for supplying the touch driving signal for sensing a user's touch through an FPC.

The second electrode 130 is driven as a sensing electrode for sensing a change of capacitance according to a user's touch, and the second electrode 130 is connected with the touch pad 150 through the connection line 140. In this case, the touch pad 150 is connected with a sensing electrode driver (not shown) for sensing a change of capacitance according to a user's touch by the use of FPC.

The sensing electrode driver (not shown) senses a user's touch position by comparing the sensed touch capacitance with a reference capacitance, and outputs the sensed touch position.

The touch screen panel is provided on a liquid crystal panel 110. As shown in FIG. 1, a predetermined portion of the second electrode 130 of the touch screen panel, which is not overlapped with the first electrode 120, is exposed to the liquid crystal panel 110, whereby the exposed portion of the second electrode 130 is influenced by noise generated in the liquid crystal panel 110.

Thus, the touch screen panel has problems of low touch sensitivity and accuracy. For example, since the capacitive type touch screen panel senses the change of capacitance according to a user's touch, it is very sensitive to the noise. That is, even though the capacitive type touch screen panel is not touched by a user, there might be malfunction or error of sensing a user's touch.

SUMMARY

A touch screen panel comprises: a first electrode disposed in a first direction; and a second electrode insulated from the first electrode, and disposed in a second direction being perpendicular to the first direction, wherein the first electrode includes a plurality of first patterns, and a second pattern formed as one body with the plurality of first patterns so as to connect the plurality of first patterns in the first direction; the second electrode includes a plurality of third patterns, and a fourth pattern formed as one body with the plurality of third patterns so as to connect the plurality of third patterns in the second direction; and the first pattern is provided at a predetermined distance in a horizontal direction from the third pattern, the second pattern crosses the fourth pattern, and an area of the first electrode is larger than an area of the second electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

In the explanation about the embodiments of the present invention, if it is mentioned that a first structure is positioned 'on or above' or 'under or below' a second structure, it should be understood that the first and second structures are brought into contact with each other, or a third structure is interposed between the first and second structures. However, if it is mentioned that a first structure is positioned 'directly on' or 'directly under' a second structure, it should be understood that the first and second structures are brought into contact with each other.

Figure 1:
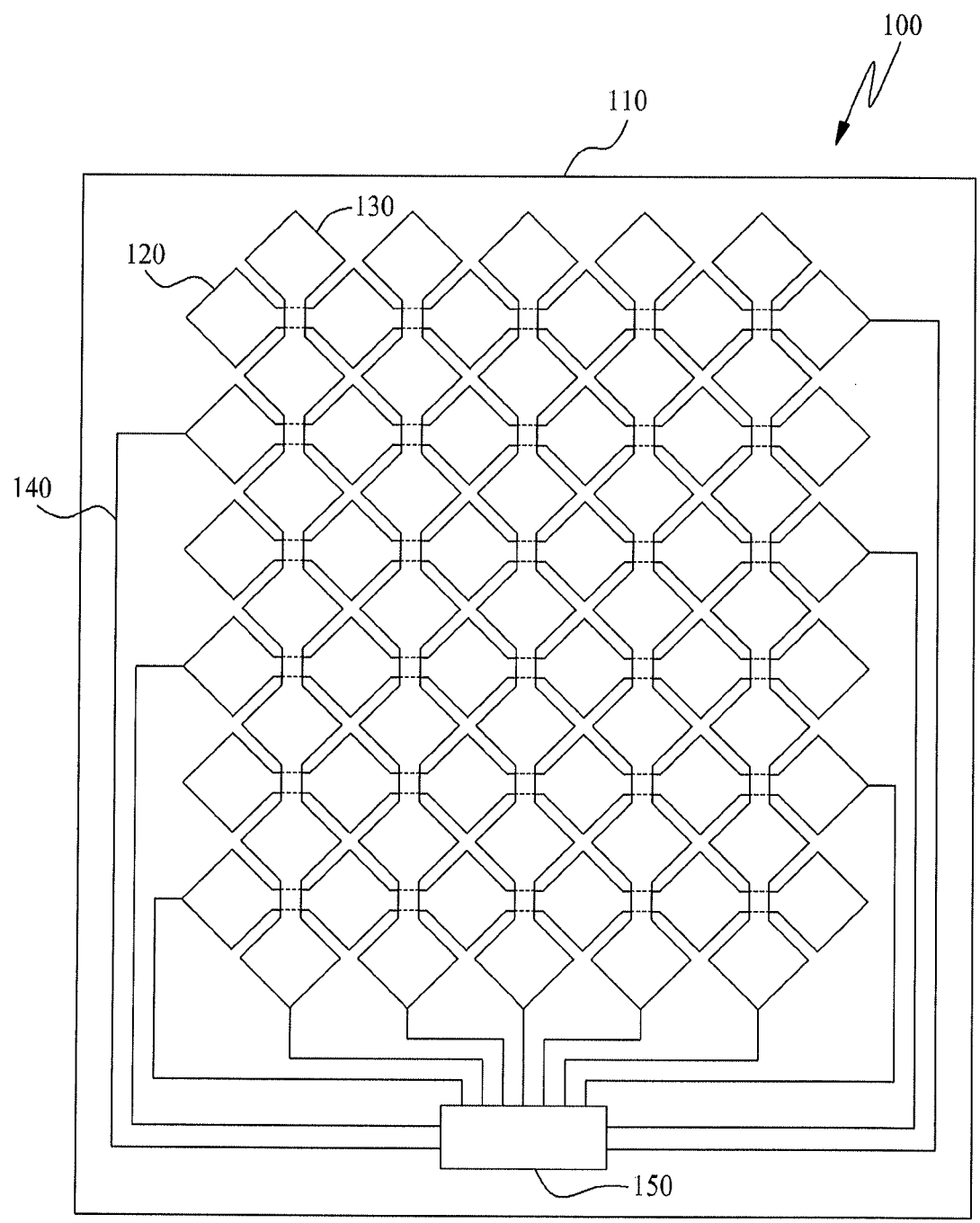
FIG. 1 is a plane view illustrating a flat display device with a capacitive type touch screen panel according to the related art.
Figure 2:
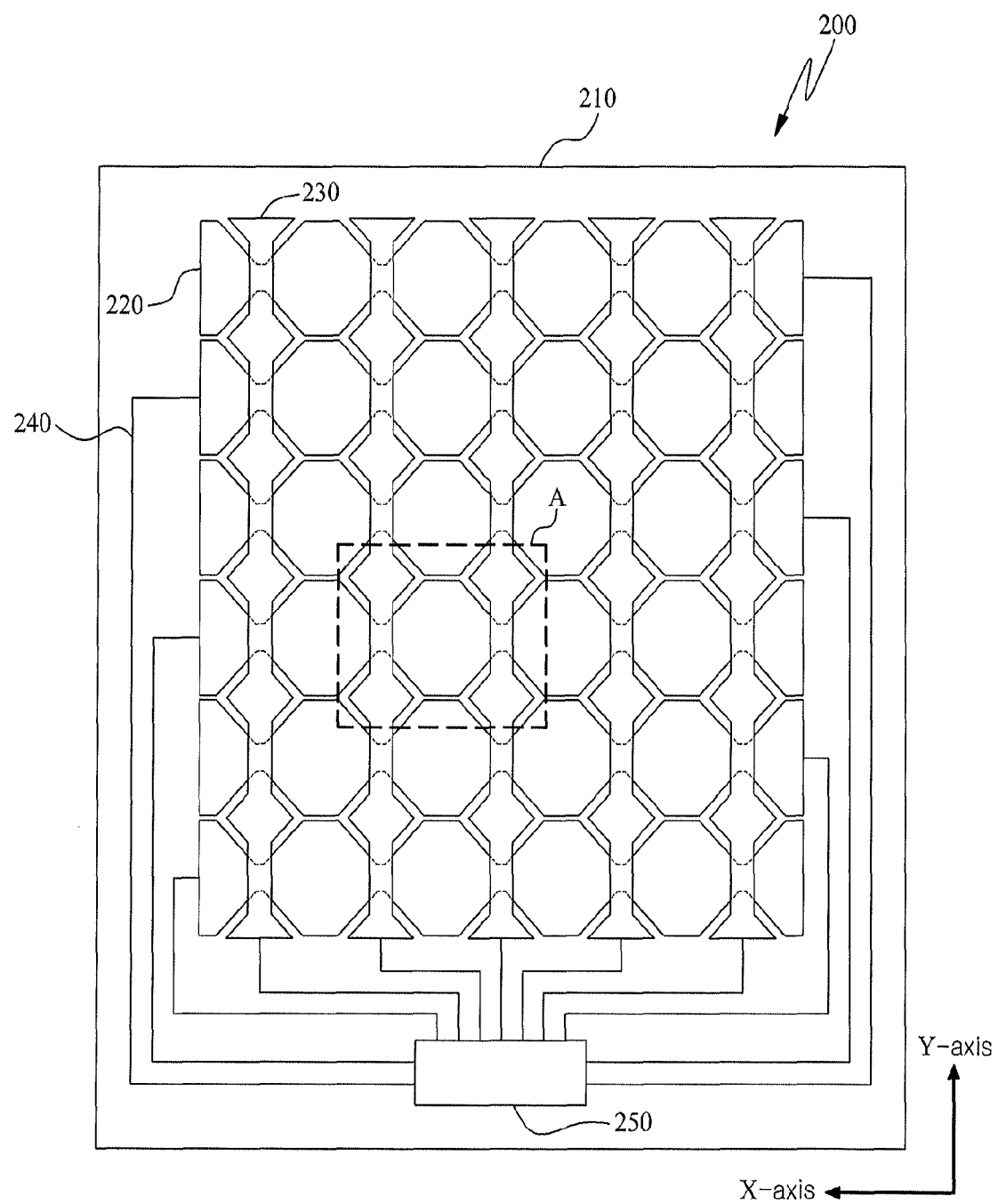
FIG. 2 is a plane view illustrating a flat display device with a capacitive type touch screen panel according to one embodiment of the present invention.

FIG. 2 is a plane view illustrating a flat display device with a capacitive type touch screen panel according to one embodiment of the present invention.

Referring to FIG. 2, a flat display device 200 according to one embodiment of the present invention includes a liquid crystal panel 210, and a touch screen panel provided on the liquid crystal panel 210.

First, the liquid crystal panel 210 drives liquid crystal by a data voltage according to a video signal, and displays an image by controlling light transmittance in a plurality of pixels according to the driving of liquid crystal.

Then, the touch screen panel provided on the liquid crystal panel 210 senses a user's touch. The touch screen panel includes a plurality of first electrodes 220 and a plurality of second electrodes 230.

The plurality of first electrodes 220 are arranged in parallel at fixed intervals in a first direction, to thereby sense a user's touch in the first direction. For example, the first electrode 220 is formed in the X-axis direction, to thereby sense a user's touch in the X-axis direction.

Also, the plurality of first electrodes 220 are connected with a touch pad 250 through a connection line 240, whereby the plurality of first electrodes 220 are driven as a driving electrode to which a driving signal for sensing a touch is applied.

The plurality of second electrodes 230 are arranged in parallel at fixed intervals in a second direction being perpendicular to the first direction, to thereby sense a user's touch in the second direction. For example, the second electrode 230 is formed in the Y-axis direction, to thereby sense a user's touch in the Y-axis direction.

Also, the plurality of second electrodes 230 are connected with the touch pad 250 through the connection line 240, whereby the plurality of second electrodes 230 are driven as a sensing electrode for sensing a change of capacitance according to a user's touch.

Although not shown in FIG. 2, the touch pad 250 is connected with a device driver (not shown) and a sensing driver (not shown) through FPC.

The device driver (not shown) is connected with the first electrode 220 driven as the driving electrode, wherein the device driver (not shown) supplies a touch driving signal to the driving electrode.

The sensing driver (not shown) is connected with the second electrode 230 driven as the sensing electrode, wherein the sensing driver (not shown) sense the change of capacitance in the sensing electrode according to a user's touch. Also, the sensing driver (not shown) sense a user's touch position by comparing the sensed touch capacitance with a reference capacitance, and outputs the sensed touch position.

The plurality of first electrodes 220 are formed in the different layer from the plurality of second electrodes 230. For example, the plurality of first electrodes 220 may be positioned in a lower layer, and the plurality of second electrodes 230 may be positioned in an upper layer.

Hereinafter, a deposition structure of the liquid crystal panel 210 and the touch screen panel will be described with reference to the cross sectional view of the flat display device 200 shown in FIG. 2.

Figure 3A:
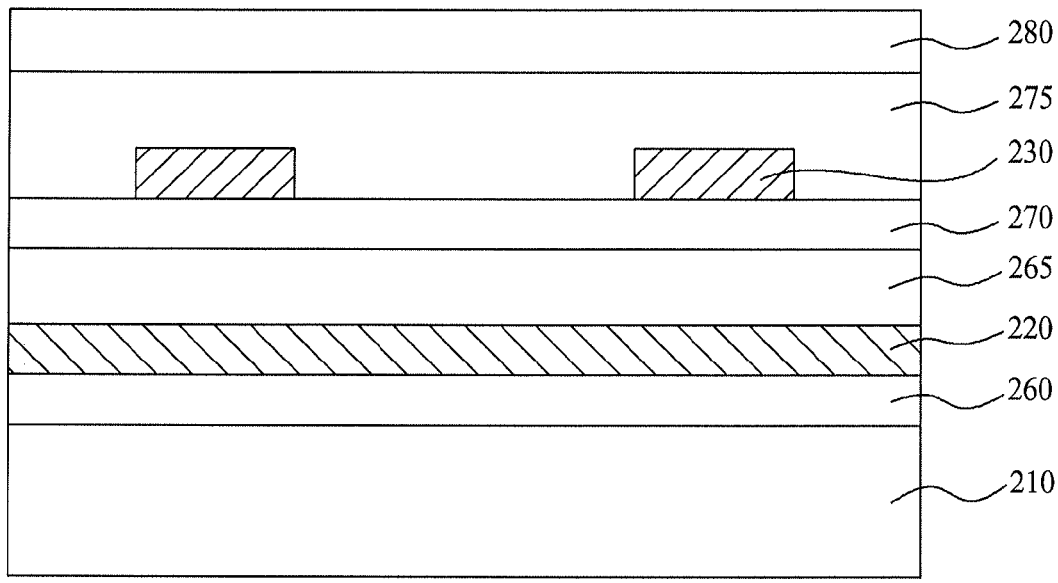
FIG. 3A is a cross sectional view illustrating the first embodiment along the X-axis direction.
Figure 3B:
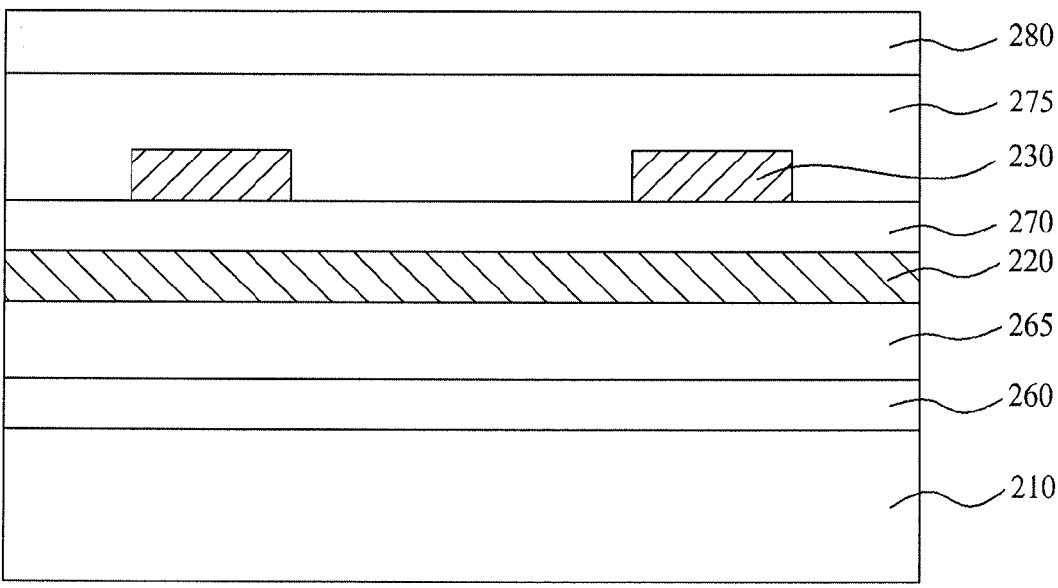
FIG. 3B is a cross sectional view illustrating the second embodiment along the X-axis direction.

FIG. 3A is a cross sectional view illustrating the first embodiment along the X-axis direction. FIG. 3B is a cross sectional view illustrating the second embodiment along the X-axis direction.

Referring to FIGS. 3A and 3B, the flat display device 200 according to one embodiment of the present invention includes the liquid crystal panel 210 and the touch screen panel.

First, although not shown in FIG. 3, the liquid crystal panel 210 includes lower and upper substrates bonded to each other with a liquid crystal layer interposed therebetween.

The lower substrate drives the liquid crystal layer, and the lower substrate includes a pixel array with the plurality of pixels.

The pixel array is formed by crossing each of a plurality of gate lines (not shown) and each of a plurality of data lines (not shown) with each other, wherein the pixel array includes the plurality of pixels formed every crossing region of the gate and data lines.

Each pixel includes a thin film transistor (not shown) connected with the gate and data lines, a pixel electrode connected with the thin film transistor, and a common electrode formed adjacent to the pixel electrode.

The thin film transistor is switched by a scan signal supplied through the gate line, and then the thin film transistor supplies the data voltage from the data line to the pixel electrode.

The pixel electrode supplies the data voltage to the pixel, and the common electrode supplies a common voltage to the pixel. When the pixel is supplied with the data voltage and the common voltage, an electric field is formed so that the liquid crystal layer is driven by the electric field, to thereby display the image.

The upper substrate includes a color filter corresponding to each pixel of the lower substrate. The upper substrate filters an incident light passing through the liquid crystal layer by the use of color filter, and then emits a predetermined color light to the external, whereby a predetermined color image is displayed on the liquid crystal panel 210.

Then, the touch screen panel is provided on the liquid crystal panel 210. The touch screen panel includes a first substrate 260, the first electrode 220, a first adhesive layer 265, a second substrate 270, the second electrode 230, a second adhesive layer 275, and a cover glass 280.

The first electrode 220 is provided between the first substrate 260 and the second substrate 270, wherein the first electrode 220 is formed in the first direction, that is, the X-axis direction.

According to one embodiment of the present invention, as shown in FIG. 3A, the first electrode 220 may be provided on an upper surface of the first substrate 260. According to another embodiment of the present invention, as shown in FIG. 3B, the first electrode 220 may be provided on a lower surface of the second substrate 270.

The first electrode 220 may be formed of a transparent conductive material, and the first electrode 220 may be obtained by photo and etching processes. In this case, the transparent conductive material may be any one among ZnO, ZnO:B, ZnO:Al, SnO$_2$, SnO$_2$:F, ITO (Indium Tin Oxide), IZO (Indium Zinc Oxide), ITZO (Indium Tin Zinc Oxide), ZTO (Zinc Tin Oxide), and ATO (Antimony Tin Oxide).

The second electrode 230 is provided between the second substrate 270 and the cover glass 280, wherein the second electrode 230 is formed in the second direction being perpendicular to the first direction, that is, the Y-axis direction.

The second electrode 230 may be formed of a transparent conductive material, and the second electrode 230 may be obtained by photo and etching processes. In this case, the transparent conductive material may be any one among ZnO, ZnO:B, ZnO:Al, SnO$_2$, SnO$_2$:F, ITO (Indium Tin Oxide), IZO (Indium Zinc Oxide), ITZO (Indium Tin Zinc Oxide), ZTO (Zinc Tin Oxide), and ATO (Antimony Tin Oxide).

The second substrate 270 may be formed of transparent glass or plastic film such as Poly-Ethylene Terephthalate (PET). The second substrate 270 is bonded to the first substrate 260 by the use of first adhesive layer 265.

In more detail, according to one embodiment shown in FIG. 3A, the first electrode 220 and the second electrode 230 are respectively formed on the upper surfaces of the first substrate 260 and the second substrate 270, and then the first substrate 260 and the second substrate 270 are bonded to each other by the use of first adhesive layer 265.

According to another embodiment shown in FIG. 3B, after the first electrode 220 is formed on the lower surface of the second substrate 270, and the second electrode 230 is formed on the upper surface of the second substrate 270; the second substrate 270 is bonded to the first substrate 260 by the use of first adhesive layer 265.

The cover glass 280 is bonded to the second substrate 270 by the use of second adhesive layer 275, to thereby protect the touch screen panel.

FIGS. 2 and 3 illustrate that the second electrode 230 is positioned above the first electrode 220. According to another embodiment of the present invention, the first electrode 220 may be positioned above the second electrode 230.

FIGS. 4 to 7 illustrate only patterns of the first electrode 220 and the second electrode 230 without showing the liquid crystal panel 210, the first substrate 260, the first adhesive layer 265, the second substrate 270, the second adhesive layer 275, and the cover glass 280.

Figure 4:
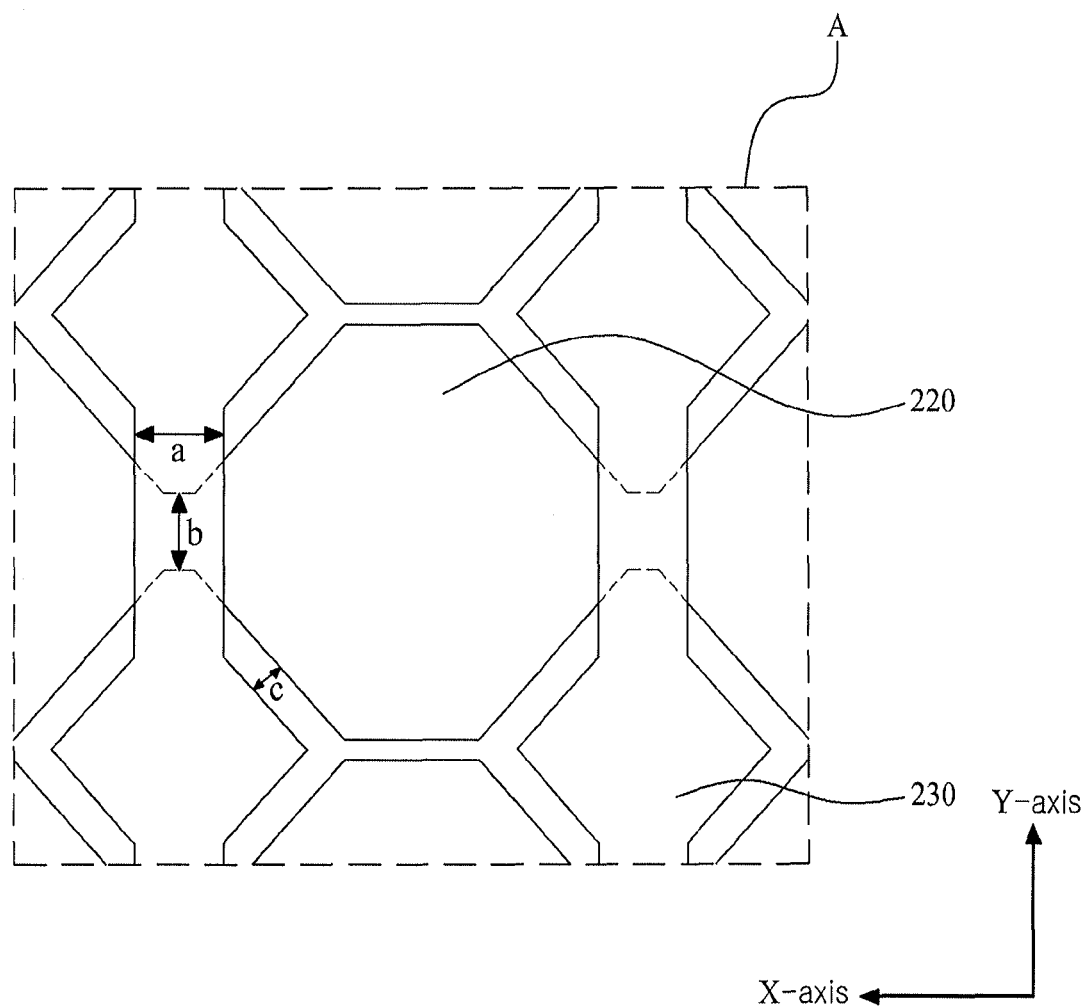
FIG. 4 is an expanded view illustrating 'A' of FIG. 2.

FIG. 4 is an expanded view illustrating 'A' of FIG. 2.

Referring to FIG. 4, the plurality of first electrodes 220 are provided in parallel at fixed intervals in the first direction, that is, the X-axis direction. The first electrode 220 may be obtained by forming the transparent conductive material on the first substrate 260, and patterning the transparent conductive material by the photo and etching processes using a mask.

The plurality of second electrodes 230 are provided in parallel at fixed intervals in the second direction, that is, the Y-axis direction. The second electrode 230 may be obtained by forming the transparent conductive material on the second substrate 270, and patterning the transparent conductive material by the photo and etching processes using a mask.

Meanwhile, an area of the second electrode 230 is smaller than an area of the first electrode 220. Since a predetermined portion of the second electrode 230 of the touch screen panel, which is not overlapped with the first electrode 220, is exposed to the liquid crystal panel 210, the exposed portion of the second electrode 230 is influenced by noise generated in the liquid crystal panel 210. Thus, in order to reduce the influence of noise of the liquid crystal panel 210, the area of second electrode 230 is decreased in size.

Accordingly, in case of the touch screen panel according to one embodiment of the present invention, the area of second electrode 230 is about 20%~50% in comparison with the area of first electrode 220.

Hereinafter, a detailed pattern structure of the first electrode 220 and the second electrode 230 will be described with reference to FIGS. 5A and 5B.

Figure 5A:
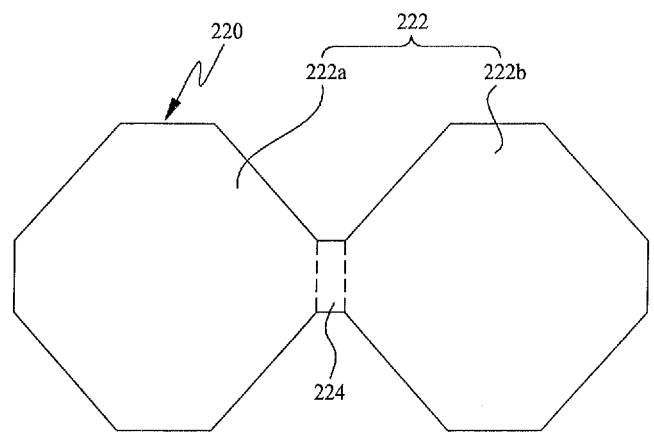
FIG. 5A illustrates a pattern of a first electrode shown in FIG. 2.

FIG. 5A illustrates a pattern of the first electrode shown in FIG. 2.

Referring to FIG. 5A, the first electrode 220 includes a plurality of first patterns 222, and a second pattern 224 for connection of the plurality of first patterns 222.

As shown in FIG. 5A, the first pattern 222 may be a polygonal shape with a predetermined area. In addition to the polygonal shape, the first pattern 222 may be a diamond shape, a square shape, a circle shape, an elliptical shape, a triangle shape, a rectangular shape, or any other shape.

In order to form the first pattern 222 and the second pattern 224 as one body, the second pattern 224 is extended from the first pattern 222, to thereby connect the plurality of first patterns 222 in the first direction. The second pattern 224 is provided between each of the plurality of first patterns 222, that is, the second pattern 224 is extended from one first pattern 222a to another first pattern 222b.

Figure 5B:
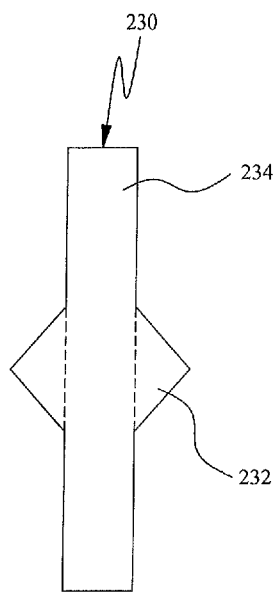
FIG. 5B illustrates a pattern of a second electrode shown in FIG. 2.

FIG. 5B illustrates a pattern of the second electrode shown in FIG. 2.

Referring to FIG. 5B, the second electrode 230 includes a plurality of third patterns 232, and a fourth pattern 234 for connection of the plurality of third patterns 232.

As shown in FIG. 5B, polygonal-shaped two of the third patterns 232 are arranged symmetrically with respect to the fourth pattern 234. In addition to the polygonal shape, the third pattern 232 may be a diamond shape, a square shape, a circle shape, an elliptical shape, a triangle shape, a rectangular shape, or any other shape.

In order to form the third pattern 232 and the fourth pattern 234 as one body, the fourth pattern 234 is extended from the third pattern 232, to thereby connect the plurality of third patterns 232 in the second direction. The fourth pattern 234 is formed in a bar shape extended in the second direction.

Referring once again to FIG. 4, the second pattern 224 of the first electrode 220 crosses the fourth pattern 234 of the second electrode 230. In this case, a mutual capacitance ($C_m$)

is generated in the crossing region of the second pattern 224 and the fourth pattern 234 (hereinafter, referred to as 'crossing region').

According to one embodiment of the present invention, a width (b) of the second pattern 224 may be the same as or smaller than a width (a) of the fourth pattern 234. In this case, the width (b) of the second pattern 224 is a width in a direction perpendicular to an extended longitudinal direction of the first electrode 220, and the width (a) of the fourth pattern 234 is a width in a direction perpendicular to an extended longitudinal direction of the second electrode 230.

The first pattern 222 of the first electrode 220 is provided at a predetermined distance in a horizontal direction from the third pattern 232 of the second electrode 230, whereby the first pattern 222 of the first electrode 220 is not overlapped with the third pattern 232 of the second electrode 230. Preferably, the horizontal distance (c) is limited to about 30 µm~700 µm.

This is because a parasitic capacitance and the change of capacitance are influenced by the horizontal distance (c) between the first pattern 222 and the third pattern 232.

In more detail, in case of the capacitive type touch screen panel, the change of capacitance ($\Delta C$) is sensed in the crossing region of the first electrode 220 and the second electrode 230, to thereby sense whether or not there is a user's touch. The higher the change of capacitance becomes, the more the touch sensitivity is improved.

In the capacitive type touch screen panel, when a user's touch is sensed, the parasitic capacitance ($C_p$) is generated in the crossing region except the touched position. The parasitic capacitance ($C_p$) is proportion to the mutual capacitance ($C_m$). Accordingly, it is preferable that the mutual capacitance ($C_m$) be decreased in order to improve the touch sensitivity.

The following Table 1 shows the change of capacitance ($\Delta C$) and the mutual capacitance ($C_m$) according to the horizontal distance (c) between the first pattern 222 and the third pattern 232.

TABLE 1

| Horizontal distance (c) | Change of capacitance ($\Delta C$) | Mutual capacitance ($C_m$) |
| --- | --- | --- |
| 0 mm | 0.12739 | 0.34028 |
| 0.25 mm | 0.12984 | 0.24801 |
| 0.5 mm | 0.13004 | 0.19946 |
| 0.75 mm | 0.12482 | 0.16703 |
| 1 mm | 0.1162 | 0.14233 |

As shown in the above Table 1, the mutual capacitance ($C_m$) is gradually decreased according as the horizontal distance (c) is gradually increased. Thus, the parasitic capacitance ($C_p$) which is proportion to the mutual capacitance ($C_m$) is also gradually decreased according as the horizontal distance (c) is gradually increased.

Meanwhile, the change of capacitance ($\Delta C$) is increased according to the increase of the horizontal distance (c). However, if the horizontal distance (c) is more than 0.7 mm, the change of capacitance ($\Delta C$) is decreased, instead of being increased, according to the increase of the horizontal distance (c).

Eventually, in consideration of the parasitic capacitance ($C_p$) and the change of capacitance ($\Delta C$), the horizontal distance (c) between the first pattern 222 and the third pattern 232 is limited to a range of about 30 µm~700 µm, preferably.

Meanwhile, the third pattern 232 occupies about 10%~50% of the entire area of the second electrode 230. Accordingly, the third pattern 232 with the predetermined area as well as the fourth pattern 234 is formed in the second electrode 230, to thereby increase the change of capacitance ($\Delta C$). Simultaneously, since the third pattern 232 exposed to the liquid crystal panel 210 occupies about 10%~50% of the entire area of the second electrode 230, whereby it is possible to reduce the influence of noise generated in the liquid crystal panel 210.

Figure 6:
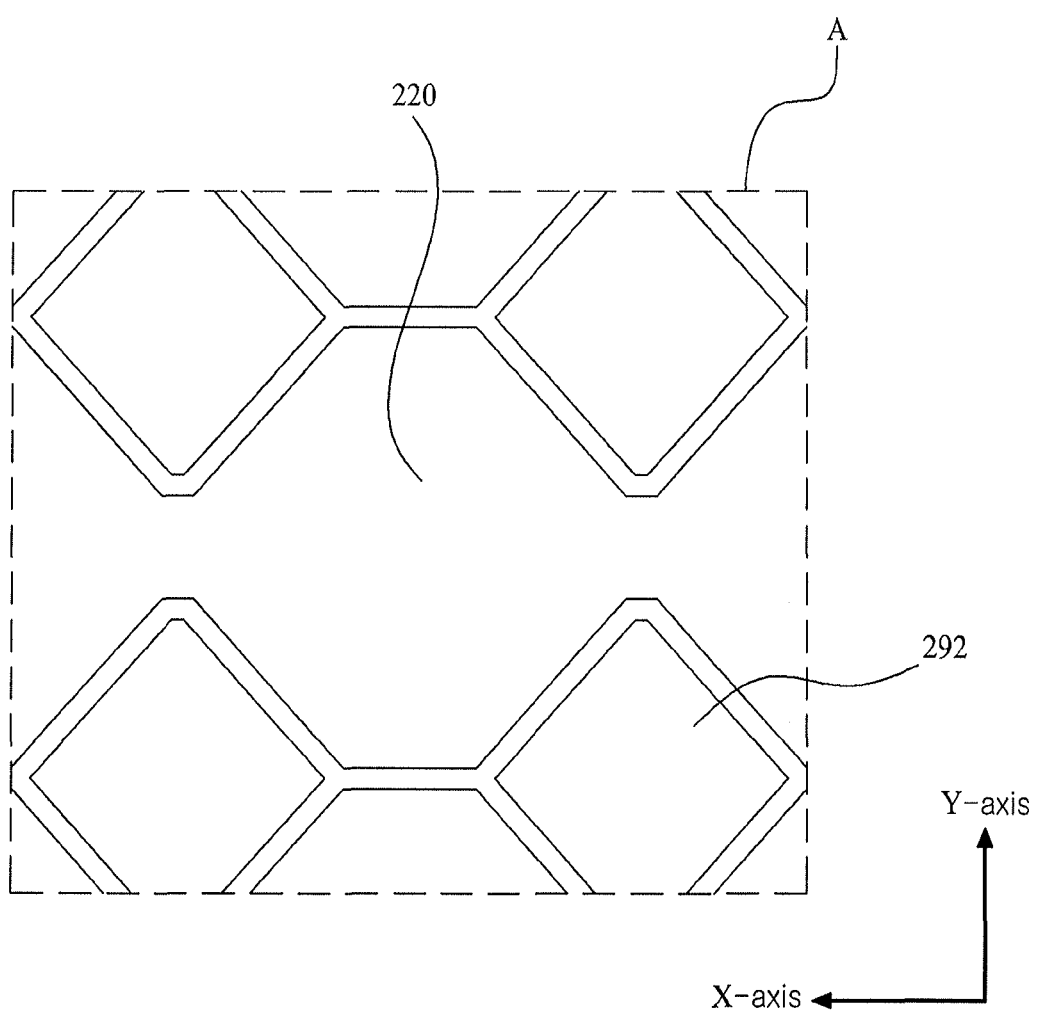
FIG. 6 illustrates a first dummy pattern.

FIG. 6 illustrates a first dummy pattern.

The touch screen panel is provided on the liquid crystal panel 210, wherein the light emitted from the liquid crystal panel 210 passes through the touch screen panel, and then reaches user's eyes. Also, the external light incident from the external is reflected by the first electrode 220 and the second electrode 230 in the touch screen panel.

In this case, a user discern pattern shapes of the first electrode 220 and the second electrode 230 of the flat display device 200 by a difference of reflectivity between the first electrode 220 and the second electrode 230, whereby visibility is lowered.

In order to overcome the above problem, the touch screen panel may further include the first dummy pattern 292.

The first dummy pattern 292 is formed between each of the plurality of first electrodes 220 provided in the first direction, wherein the first dummy pattern 292 is positioned at a predetermined interval from each of the plurality of first electrodes 220. In this case, the first dummy pattern 292 may be formed of the same material as the first electrode 220, and the first dummy pattern 292 may be formed in the same layer as the first electrode 220.

The first dummy pattern 292 has a pattern separated from the first electrode 220, wherein the first dummy pattern 292 does not perform a function of sensing a user's touch position.

The first dummy pattern 292 is positioned under the second electrode 230 while being overlapped with the second electrode 230, to thereby decrease the difference of reflectivity between the first electrode 220 and the second electrode 230.

Figure 7A:
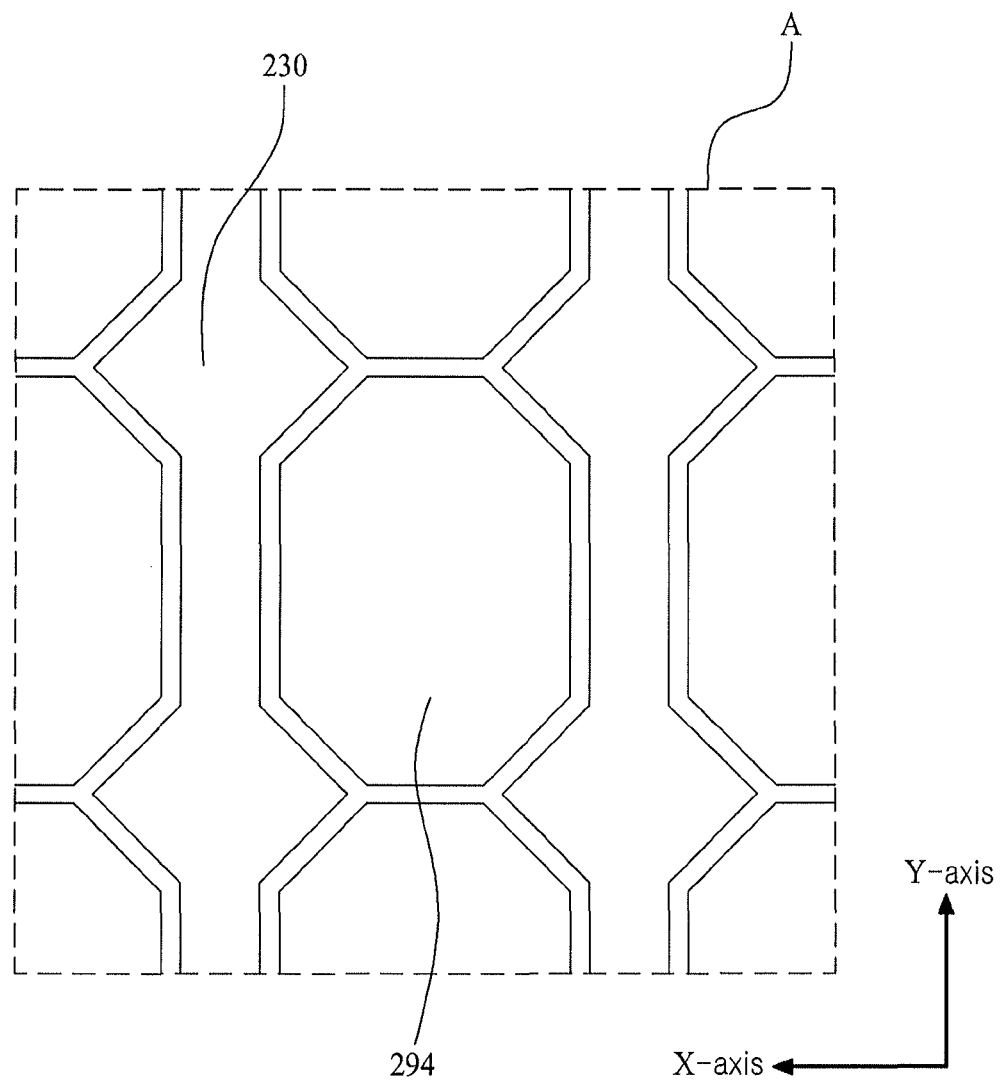
FIG. 7A illustrates the first embodiment of second dummy pattern.

FIG. 7A illustrates the first embodiment of a second dummy pattern.

Referring to FIG. 7A, in order to improve visibility of the flat display device 200, the touch screen panel may further include the second dummy pattern 294.

The second dummy pattern 294 is formed between each of the plurality of second electrodes 230 provided in the second direction, wherein the second dummy pattern 294 is positioned at a predetermined interval from each of the plurality of second electrodes 230. In this case, the second dummy pattern 294 may be formed of the same material as the second electrode 230, and the second dummy pattern 294 may be formed in the same layer as the second electrode 230.

The second dummy pattern 294 has a pattern separated from the second electrode 230, wherein the second dummy pattern 294 does not perform a function of sensing a user's touch position.

The second dummy pattern 294 is positioned above the first electrode 220 while being overlapped with the first electrode 220, to thereby decrease the difference of reflectivity between the first electrode 220 and the second electrode 230.

Figure 7B:
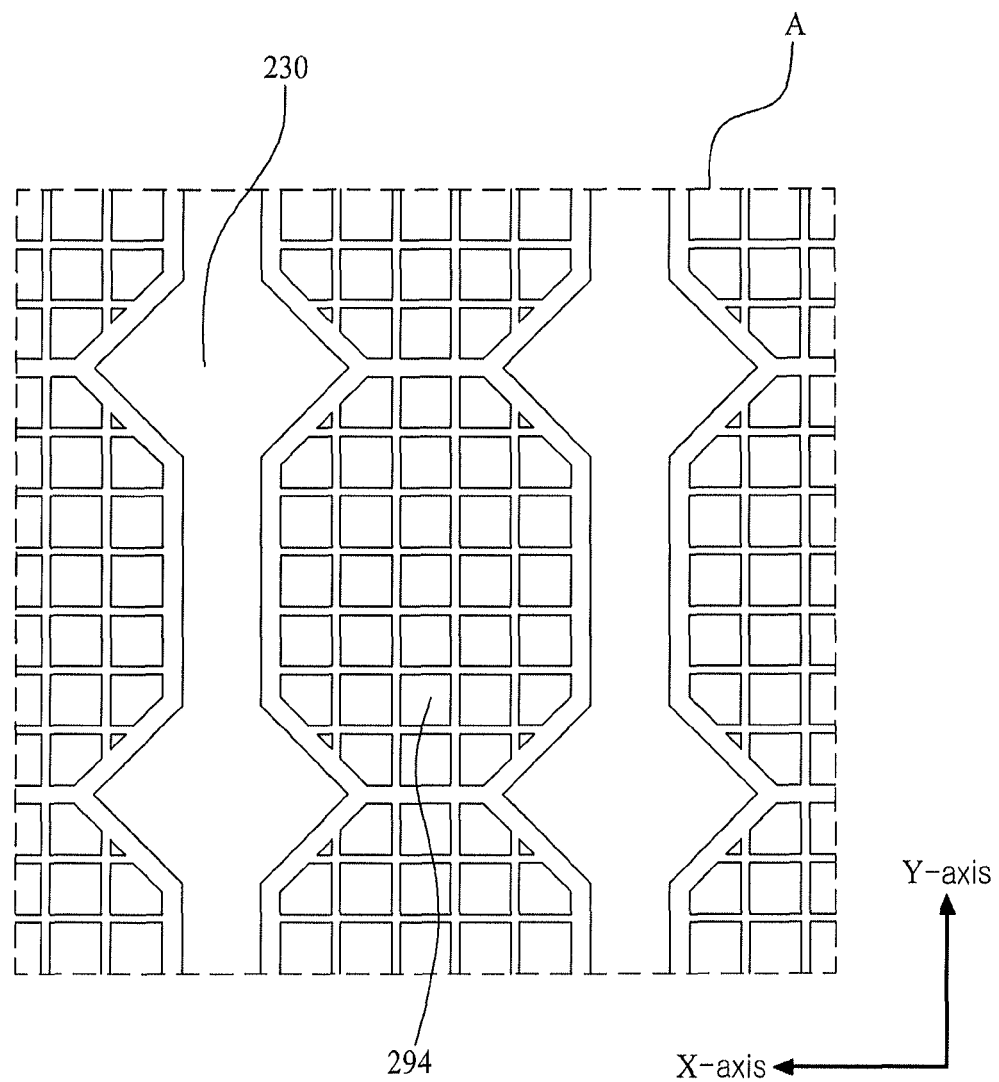
FIG. 7B illustrates the second embodiment of second dummy pattern.

FIG. 7B illustrates the second embodiment of second dummy pattern.

Even though the second dummy pattern 294 is provided at a predetermined interval from the second electrode 230, the second dummy pattern 294 might be moved by an external pressure or impact. If the second dummy pattern 294 is brought into contact with the second electrode 230 by the external pressure or impact, the second dummy pattern 294 is electrically connected with the second electrode 230, whereby the second dummy pattern 294 functions as the second electrode 230.

Thus, the overlapped region between the first electrode 220 and the second electrode 230 is increased so that the parasitic capacitance ($C_p$) is increased, to thereby lower the touch sensitivity.

Especially, as shown in FIG. 7A, if the second dummy pattern 294 is formed as one piece, the parasitic capacitance ($C_p$) is largely increased so that the touch sensitivity is largely lowered.

In order to overcome the above problem, as shown in FIG. 7B, the second dummy pattern 294 may comprise a plurality of dummy pieces arranged at fixed intervals.

Owing to the plurality of dummy pieces included in the second dummy pattern 294, even though one of the dummy pieces is brought into contact with the second electrode 230, and is electrically connected with the second electrode 230, the other dummy pieces are not influenced, that is, there is little influence on the touch sensitivity.

Although not shown, in the same manner as the second dummy pattern 294, the first dummy pattern 292 may comprise a plurality of dummy pieces arranged at fixed intervals.

Meanwhile, the touch screen panel may include at least one of the first dummy pattern 292 and the second dummy pattern 294.

Figure 8A:
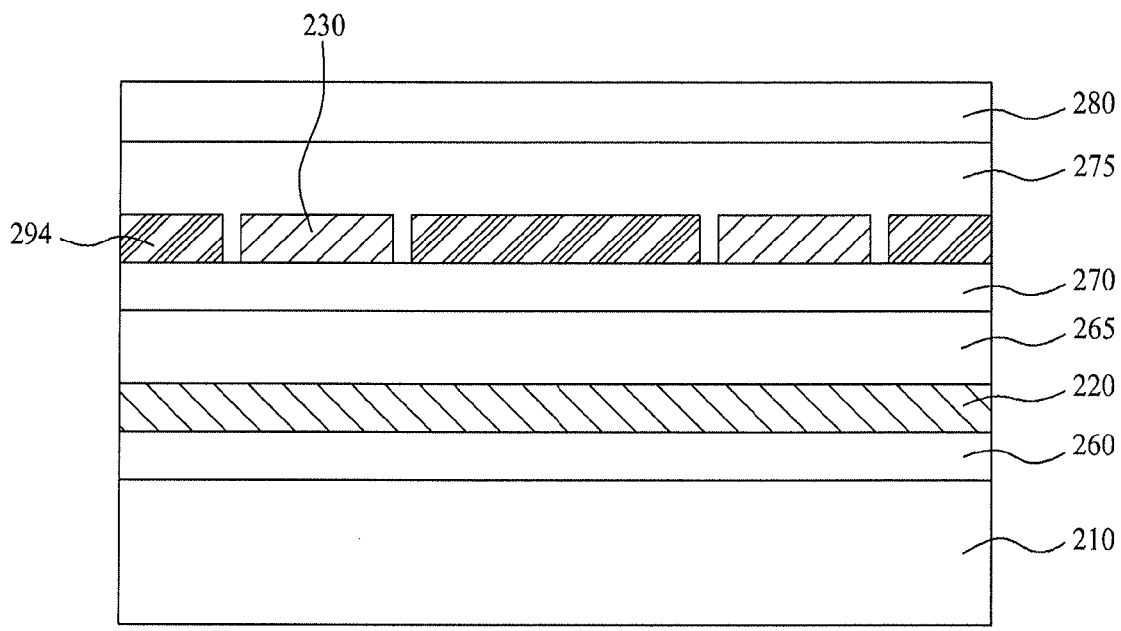
FIG. 8A is a cross sectional view illustrating a flat display device with first and second dummy patterns along the X-axis direction.
Figure 8B:
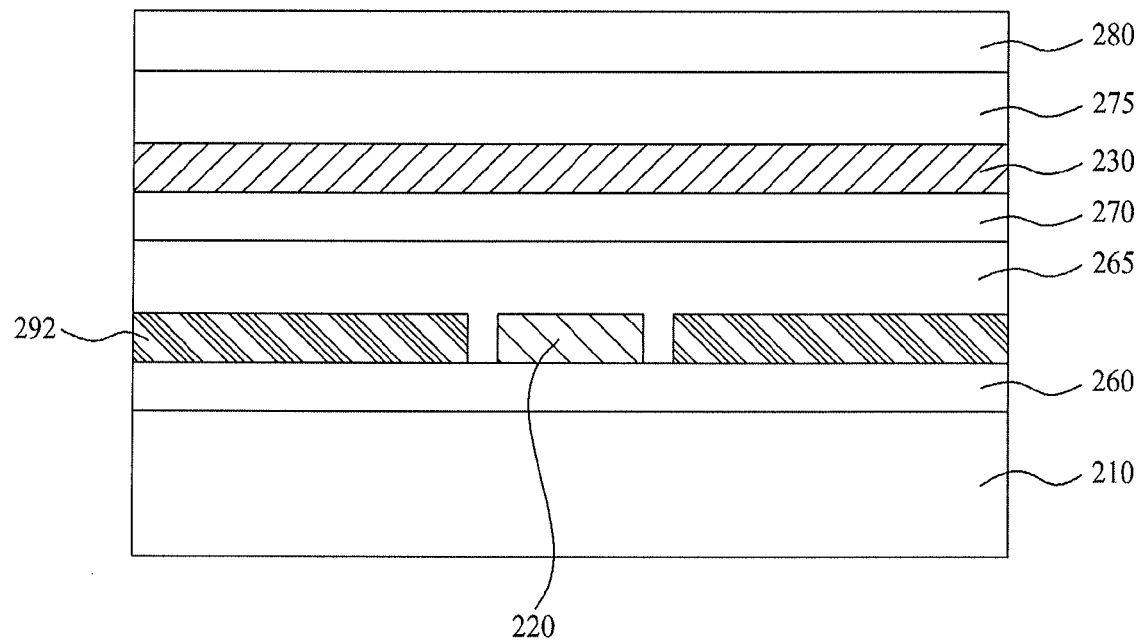
FIG. 8B is a cross sectional view illustrating a flat display device with first and second dummy patterns along the Y-axis direction.

According to one embodiment of the present invention, the touch screen panel may include both the first dummy pattern 292 and the second dummy pattern 294. In more detail, as shown in FIG. 8A, the touch screen panel may be provided with the second electrodes 230 formed at fixed intervals on the second substrate 270, and the second dummy pattern 294 formed between each of the plurality of second electrodes 230. Also, as shown in FIG. 8B, the first electrodes 220 may be formed at fixed intervals on the first substrate 260, and the first dummy pattern 292 may be formed between each of the first electrodes 220.

Figure 9A:
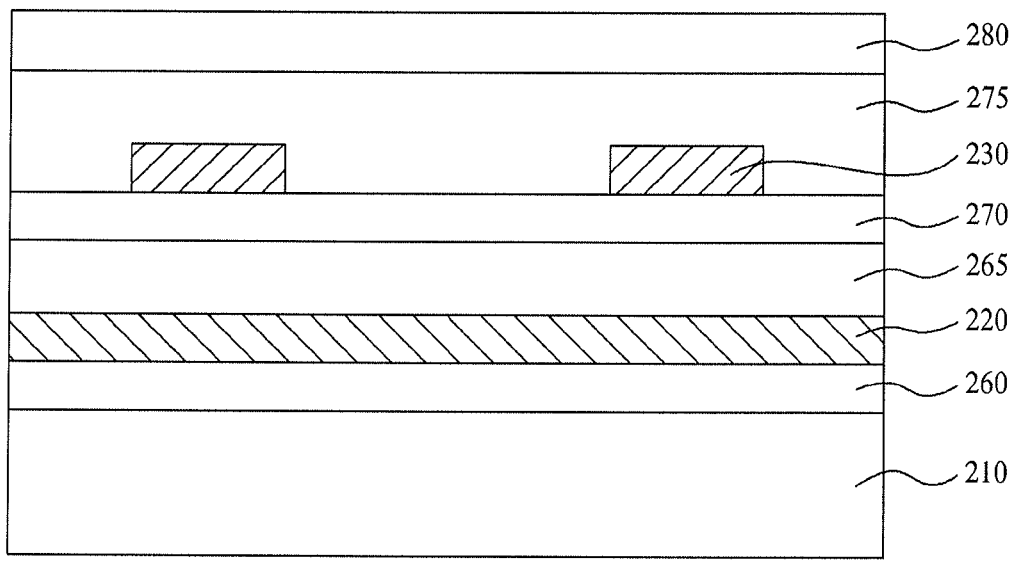
FIG. 9A is a cross sectional view illustrating a flat display device with a first dummy pattern along the X-axis direction.
Figure 9B:
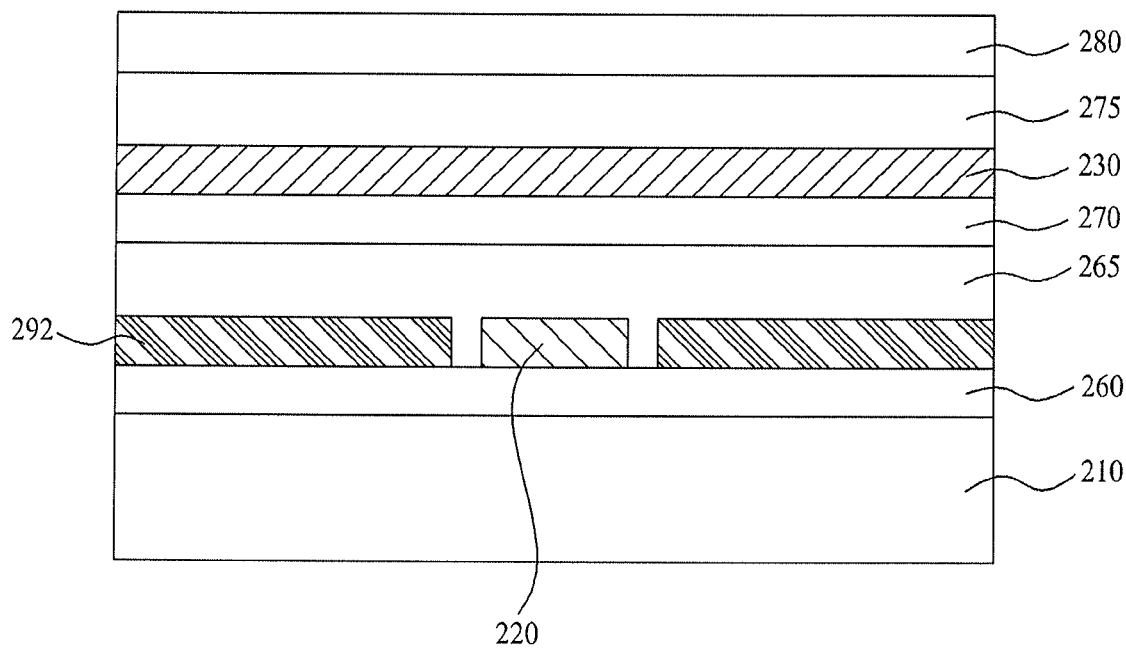
FIG. 9B is a cross sectional view illustrating a flat display device with a first dummy pattern along the Y-axis direction.
Figure 10A:
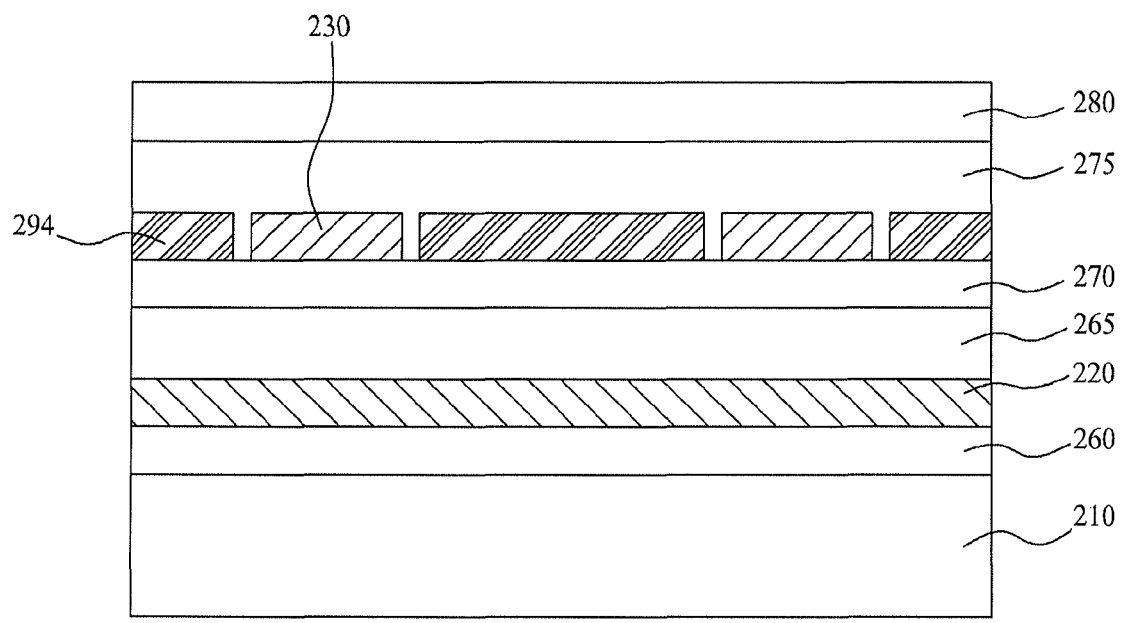
FIG. 10A is a cross sectional view illustrating a flat display device with a second dummy pattern along the X-axis direction.
Figure 10B:
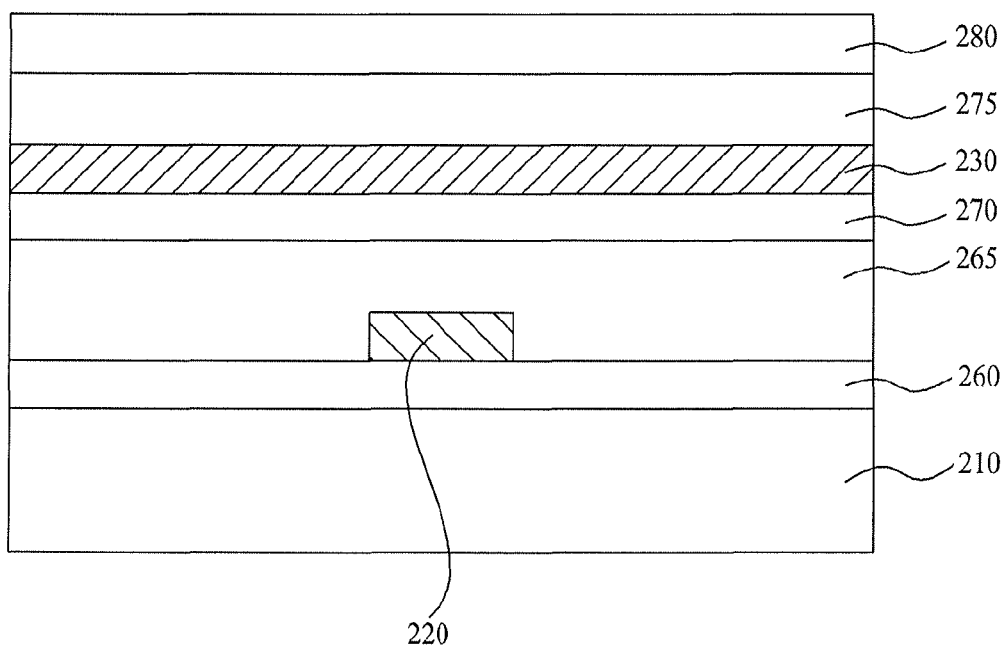
FIG. 10B is a cross sectional view illustrating a flat display device with a second dummy pattern along the Y-axis direction.

According to another embodiment of the present invention, as shown in FIGS. 9A and 9B, the touch screen panel may include only the first dummy pattern 292. According to another embodiment of the present invention, as shown in FIGS. 10A and 10B, the touch screen panel may include only the second dummy pattern 294.

According to the present invention, the area of the second electrode 230 is smaller than the area of the first electrode 220, whereby it is possible to reduce the influence of noise generated in the liquid crystal panel 210, to thereby improve the touch sensitivity.

Also, the horizontal distance (c) between the first pattern 222 of the first electrode 220 and the third pattern 232 of the second electrode 230 is optimized so that it is possible to decrease the parasitic capacitance ($C_p$), and to increase the change of capacitance ($\Delta C$).

Also, the first dummy pattern 292 may be formed between each of the first electrodes 220, or the second dummy pattern 294 may be formed between each of the second electrodes 230, to thereby improve the visibility of flat display device 200.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen panel comprising:
a first electrode disposed in a first direction; and
a second electrode insulated from the first electrode, disposed in a second direction being perpendicular to the first direction, and disposed above the first electrode,
wherein the first electrode includes a plurality of first patterns, and a second pattern formed as one body with the plurality of first patterns so as to connect the plurality of first patterns in the first direction;
the second electrode includes a plurality of third patterns, and a fourth pattern formed as one body with the plurality of third patterns so as to connect the plurality of third patterns in the second direction;
the first pattern is provided at a predetermined distance in a horizontal direction from the third pattern, the second pattern crosses the fourth pattern, the fourth pattern completely covering the second pattern,
wherein the first electrode is a driving electrode to which a driving signal for sensing a touch is applied, and the second electrode is a sensing electrode that senses a change of capacitance according to a user's touch, and
wherein a horizontal distance between the first pattern and the third pattern is about 30 µm~700 µm.

2. The touch screen panel according to claim 1, wherein the area of second electrode is about 20%~50% in comparison with the area of first electrode.

3. The touch screen panel according to claim 1, wherein a width of the second pattern is the same as or smaller than a width of the fourth pattern.

4. The touch screen panel according to claim 1, wherein the fourth pattern is bar shaped and extends in the second direction.

5. The touch screen panel according to claim 1, wherein polygonal-shaped two of the third patterns are arranged symmetrically with respect to the fourth pattern.

6. The touch screen panel according to claim 1, wherein an area of the fourth pattern occupies about 10%~50% of the entire area of the second electrode.

7. The touch screen panel according to claim 1, further comprising a first dummy pattern which is provided at a predetermined distance from the first electrode, and overlaps with the second electrode.

8. The touch screen panel according to claim 7, wherein the first electrode and the first dummy pattern are disposed in the same layer.

9. The touch screen panel according to claim 1, further comprising a second dummy pattern which is provided at a predetermined distance from the second electrode, and overlaps with the first electrode.

10. The touch screen panel according to claim 9, wherein the second electrode and the second dummy pattern are disposed in the same layer.

11. The touch screen panel according to claim 9, wherein the second dummy pattern includes a plurality of dummy pieces arranged at fixed intervals.

12. The touch screen panel according to claim 1, wherein the fourth pattern of the second electrode overlaps a portion of the first patterns of the first electrode.

13. The touch screen panel according to claim 1, wherein the second pattern has a width extending in a direction parallel to the second direction, the fourth pattern has a width extending in a direction parallel to the first direction, the width of the second pattern is equal to or smaller than the width of the fourth pattern.

14. A touch screen panel comprising:
a first electrode disposed in a first direction; and
a second electrode insulated from the first electrode, and disposed in a second direction being perpendicular to the first direction,
wherein the first electrode includes a plurality of first patterns, and a second pattern formed as one body with the plurality of first patterns so as to connect the plurality of first patterns in the first direction;
the second electrode includes a plurality of third patterns, and a fourth pattern formed as one body with the plurality of third patterns so as to connect the plurality of third patterns in the second direction; and
the first pattern is provided at a predetermined distance in a horizontal direction from the third pattern, the second pattern crosses the fourth pattern, the fourth pattern entirely overlapping the second pattern,
wherein the first electrode is a driving electrode to which a driving signal for sensing a touch is applied, and the second electrode is a sensing electrode for sensing a change of capacitance according to a user's touch, and
wherein a horizontal distance between the first pattern and the third pattern is about 30 μm~700 μm.

\* \* \* \* \*